(12) United States Patent
Yano et al.

(10) Patent No.: US 11,943,425 B2
(45) Date of Patent: Mar. 26, 2024

(54) DISPLAY DEVICE

(71) Applicant: SONY GROUP CORPORATION, Tokyo (JP)

(72) Inventors: Tomoya Yano, Tokyo (JP); Yuji Nakahata, Tokyo (JP); Akira Tanaka, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 358 days.

(21) Appl. No.: 17/298,520

(22) PCT Filed: Nov. 7, 2019

(86) PCT No.: PCT/JP2019/043628
§ 371 (c)(1),
(2) Date: May 28, 2021

(87) PCT Pub. No.: WO2020/116082
PCT Pub. Date: Jun. 11, 2020

(65) Prior Publication Data
US 2022/0030217 A1    Jan. 27, 2022

(30) Foreign Application Priority Data

Dec. 7, 2018  (JP) ................ 2018-230114

(51) Int. Cl.
*H04N 13/363*  (2018.01)
*G03B 21/60*  (2014.01)
(Continued)

(52) U.S. Cl.
CPC ......... *H04N 13/363* (2018.05); *G03B 21/60* (2013.01); *G03H 1/0005* (2013.01); *G03H 1/0236* (2013.01); *G03H 2001/0094* (2013.01)

(58) Field of Classification Search
None
See application file for complete search history.

(56) References Cited

U.S. PATENT DOCUMENTS

| | | | |
|---|---|---|---|
| 5,760,955 A | 6/1998 | Goldenberg et al. | |
| 2012/0147003 A1* | 6/2012 | Liu | H04N 13/349 345/419 |

(Continued)

FOREIGN PATENT DOCUMENTS

| | | |
|---|---|---|
| CN | 110383833 A | 10/2019 |
| EP | 0669758 A1 | 8/1995 |

(Continued)

OTHER PUBLICATIONS

International Search Report and Written Opinion of PCT Application No. PCT/JP2019/043628, dated Jan. 28, 2020, 12 pages of ISRWO.

*Primary Examiner* — Clifford Hilaire
(74) *Attorney, Agent, or Firm* — CHIP LAW GROUP

(57) ABSTRACT

A display device according to an embodiment of the present disclosure includes: a transparent screen; one or more imaging units; and a video projection unit that acquires positional information regarding a predetermined subject included in each of captured images obtained by the one or more imaging units and then irradiates the transparent screen with video light on the basis of the positional information to cause predetermined video to appear on the transparent screen for the subject.

8 Claims, 12 Drawing Sheets

(51) Int. Cl.
    *G03H 1/00*        (2006.01)
    *G03H 1/02*        (2006.01)

(56) References Cited

U.S. PATENT DOCUMENTS

| | | | |
|---|---|---|---|
| 2014/0354957 A1* | 12/2014 | Vermeirsch | G03B 11/00 353/30 |
| 2015/0362742 A1* | 12/2015 | Yoneno | G03B 21/206 353/7 |

FOREIGN PATENT DOCUMENTS

| | | | |
|---|---|---|---|
| JP | 06-230738 | A | 8/1994 |
| JP | 07-184115 | A | 7/1995 |
| JP | 10-501636 | A | 2/1998 |
| JP | 2003-344805 | A | 12/2003 |
| JP | 2007-047366 | A | 2/2007 |
| JP | 2008-129136 | A | 6/2008 |
| JP | 2013-037082 | A | 2/2013 |
| JP | 2014-048565 | A | 3/2014 |
| JP | 2016-001211 | A | 1/2016 |
| KR | 10-1997-0703547 | A | 7/1997 |
| WO | 1995/007590 | A1 | 3/1995 |
| WO | 1996/031803 | A1 | 10/1996 |
| WO | 2018/163945 | A1 | 9/2018 |

\* cited by examiner

[ FIG. 1 ]
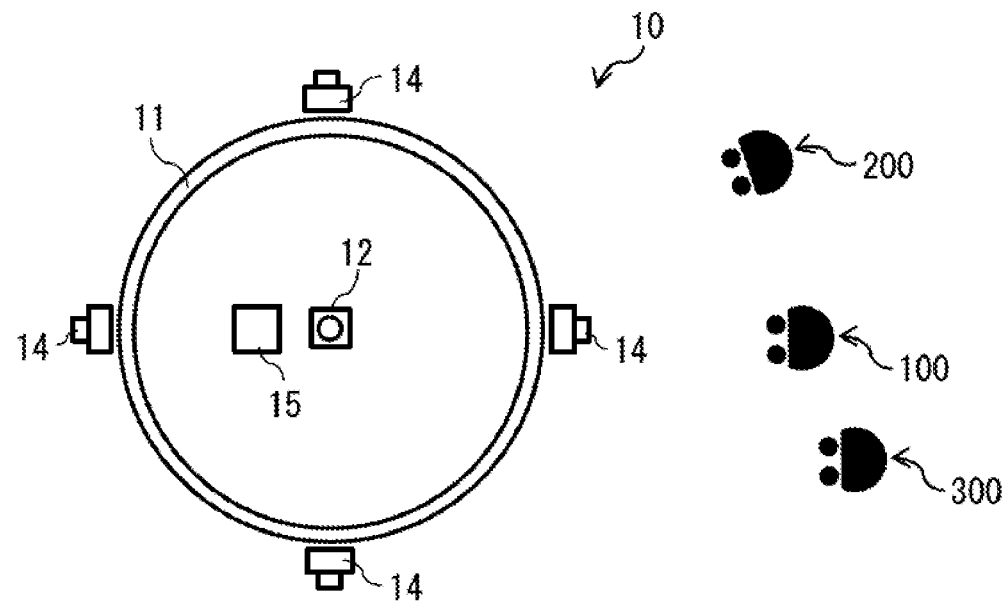
[ FIG. 2 ]
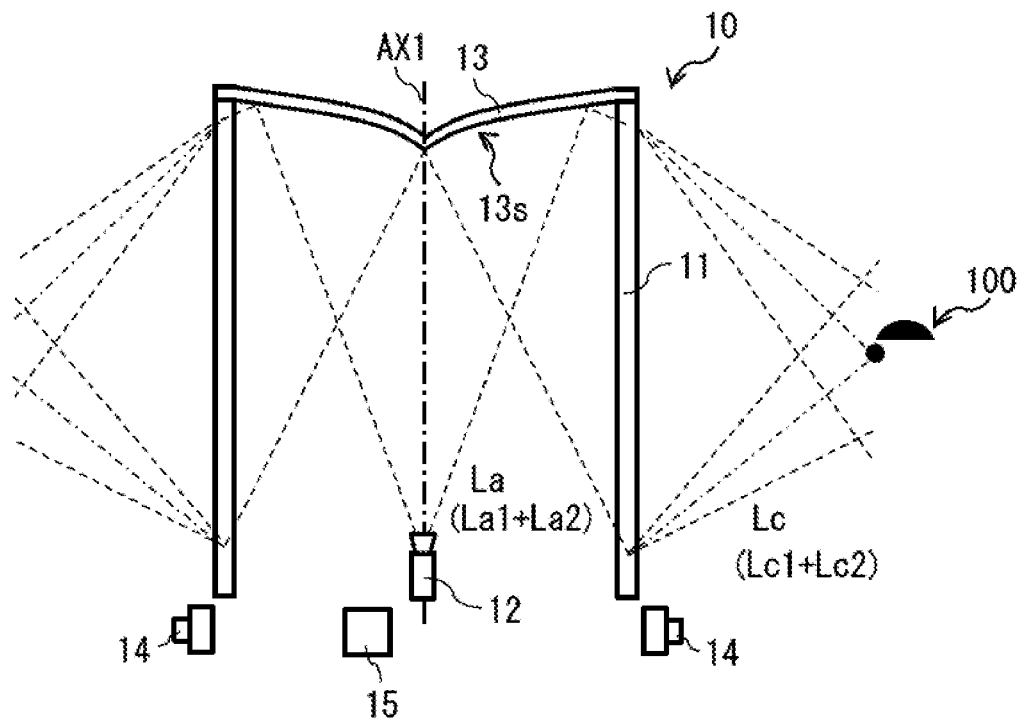

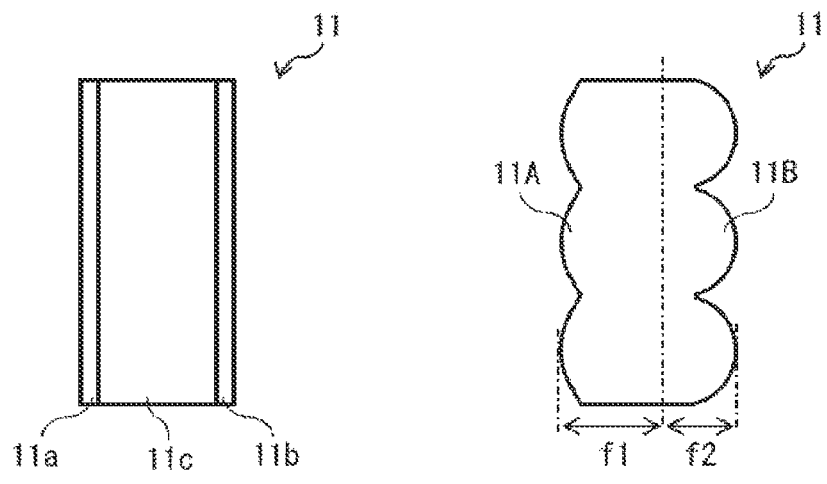
[ FIG. 3A ]   [ FIG. 3B ]
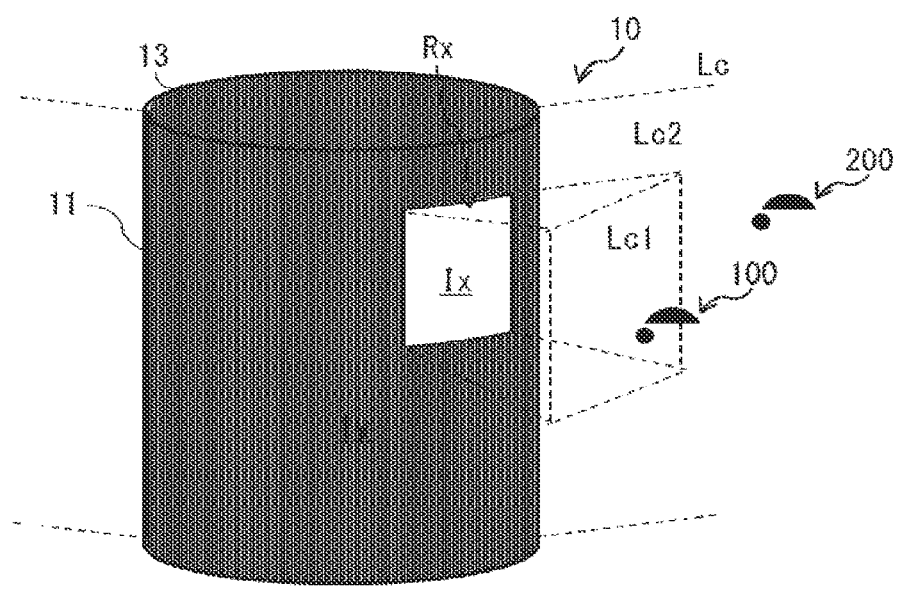
[ FIG. 4 ]

[ FIG. 5 ]
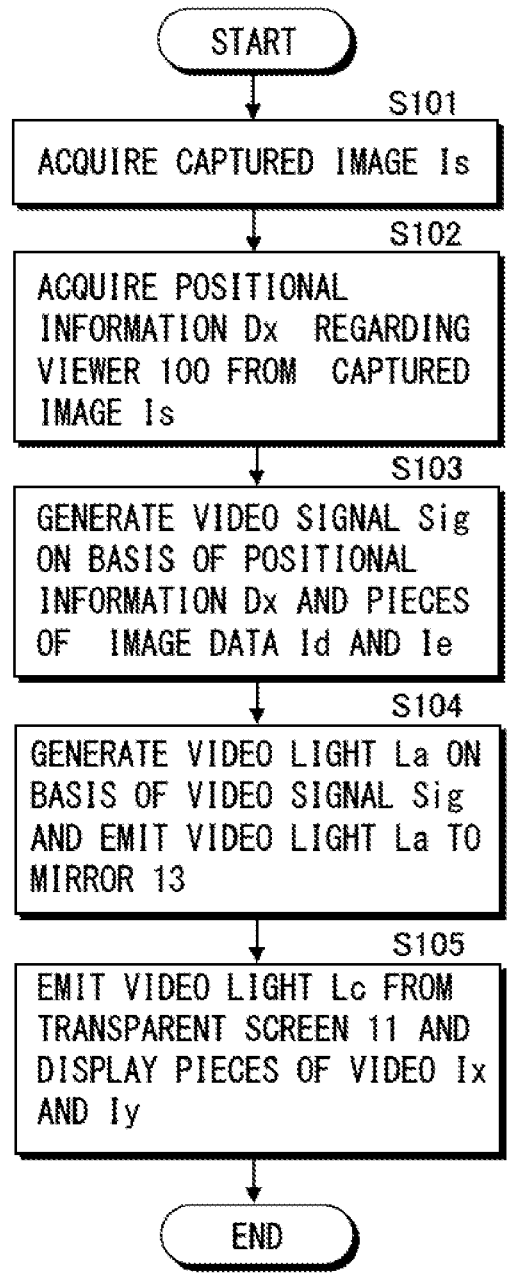

[ FIG. 6 ]
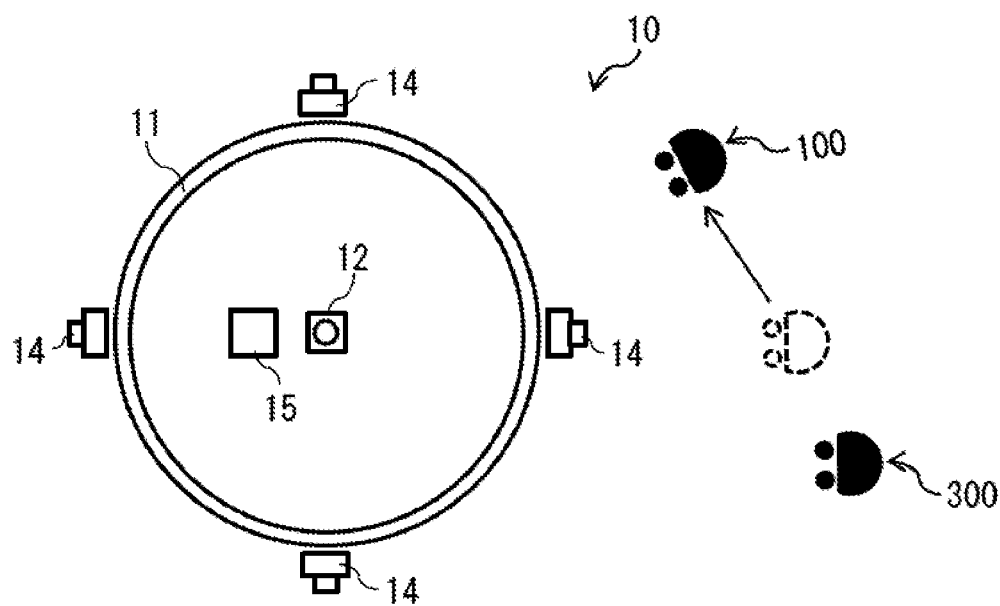
[ FIG. 7 ]
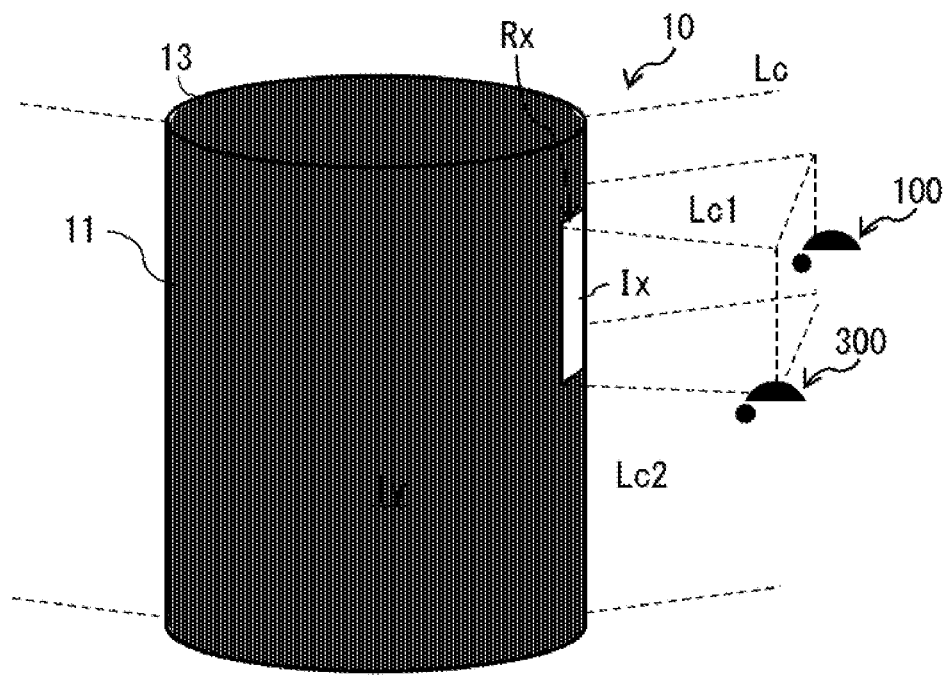

[ FIG. 8 ]
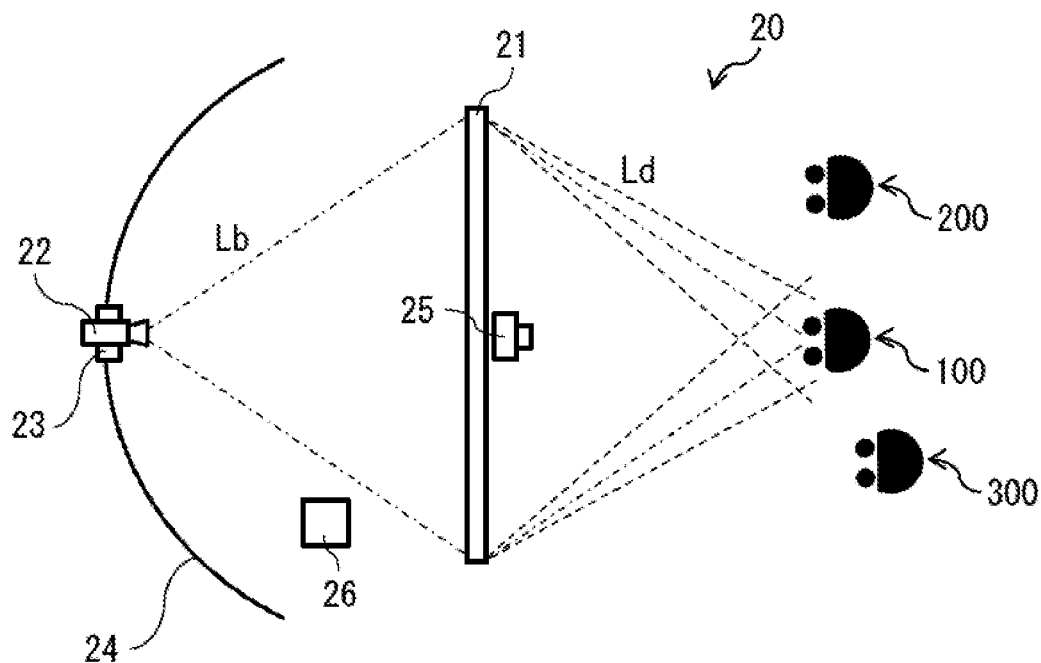
[ FIG. 9 ]
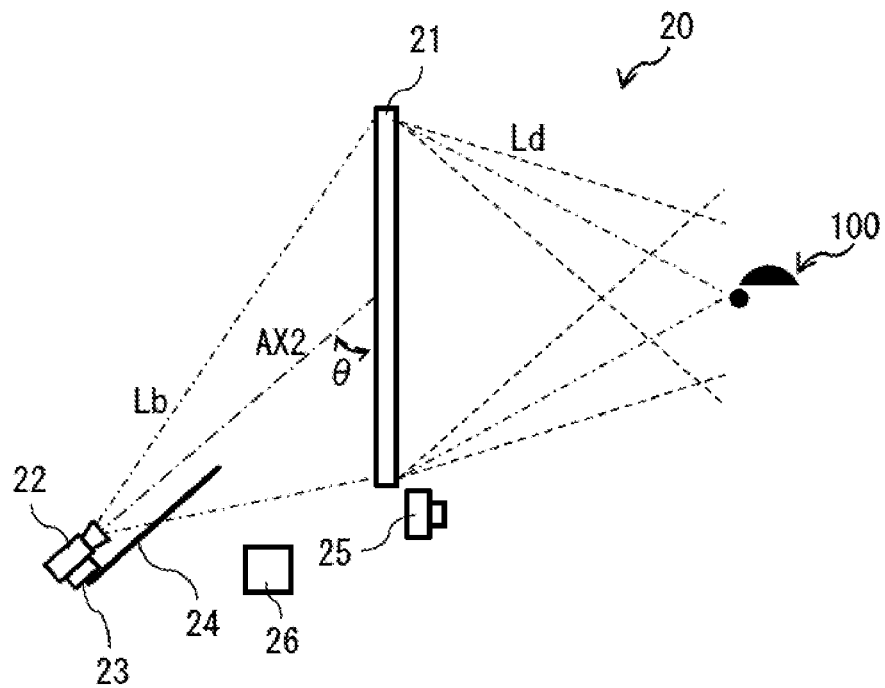

[ FIG. 10 ]
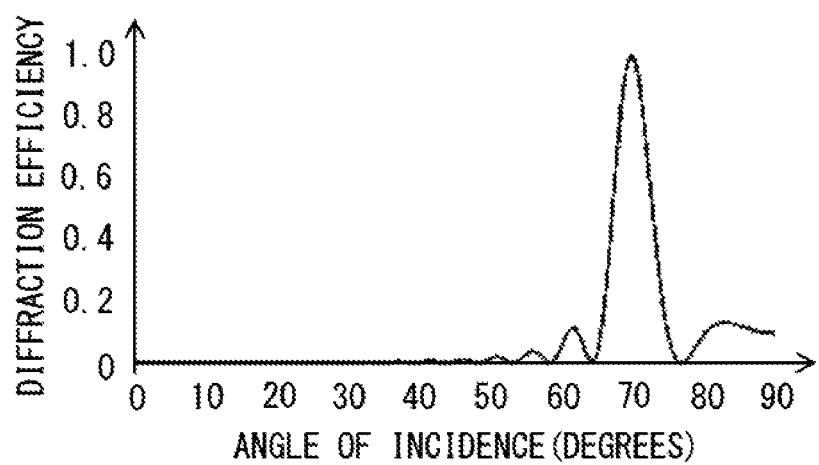
[ FIG. 11 ]
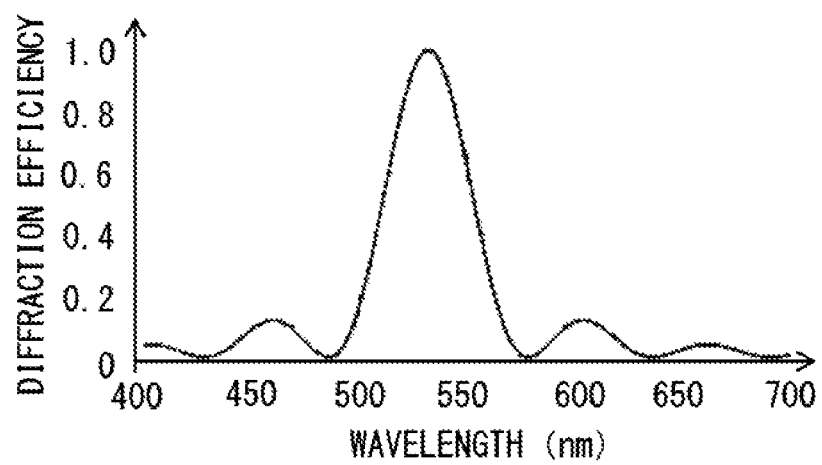

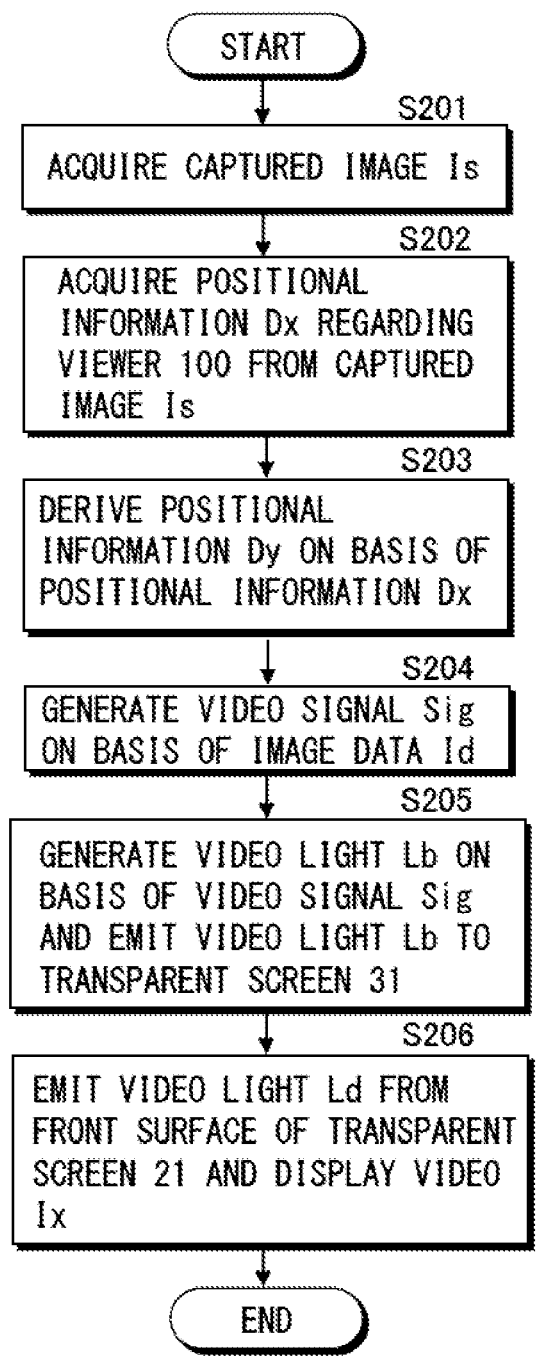
[ FIG. 12 ]

[ FIG. 13 ]
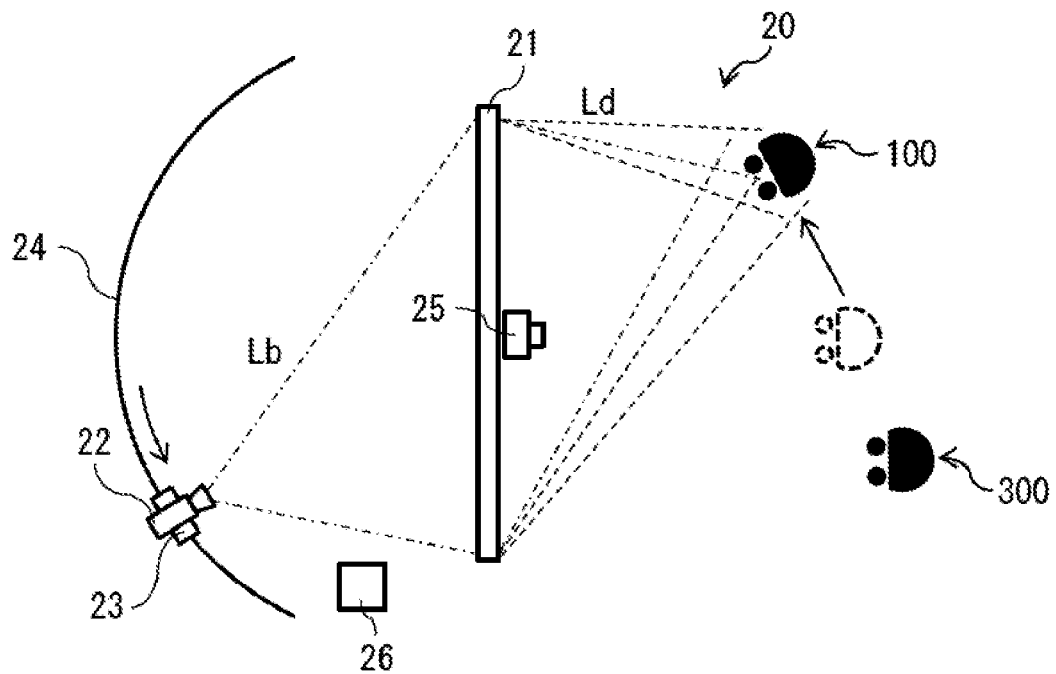
[ FIG. 14 ]
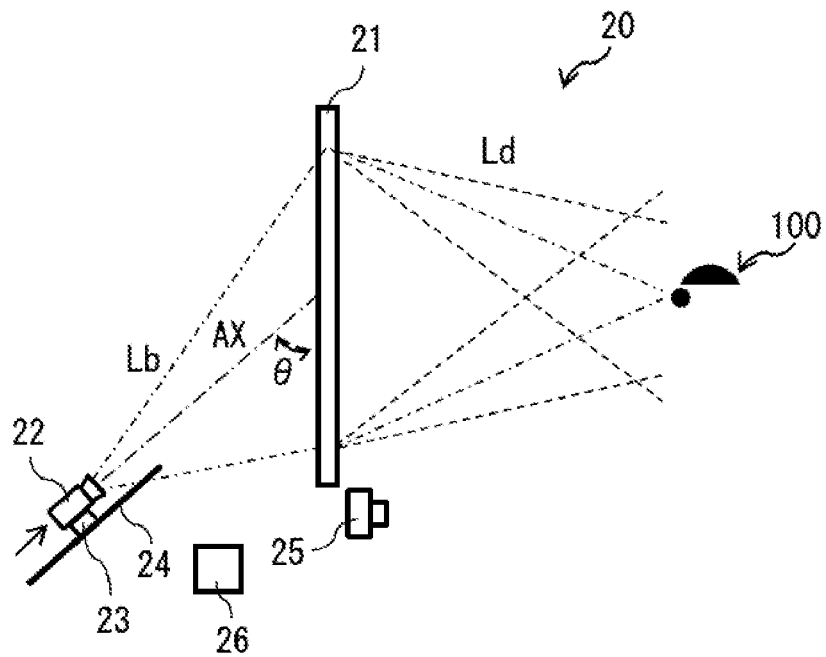

[ FIG. 15 ]
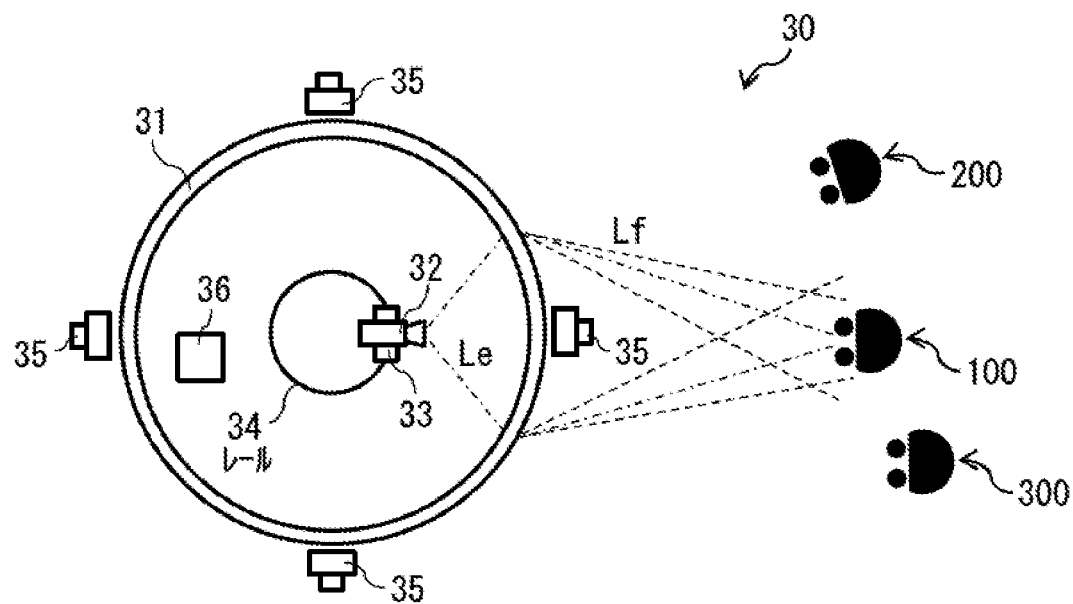
[ FIG. 16 ]
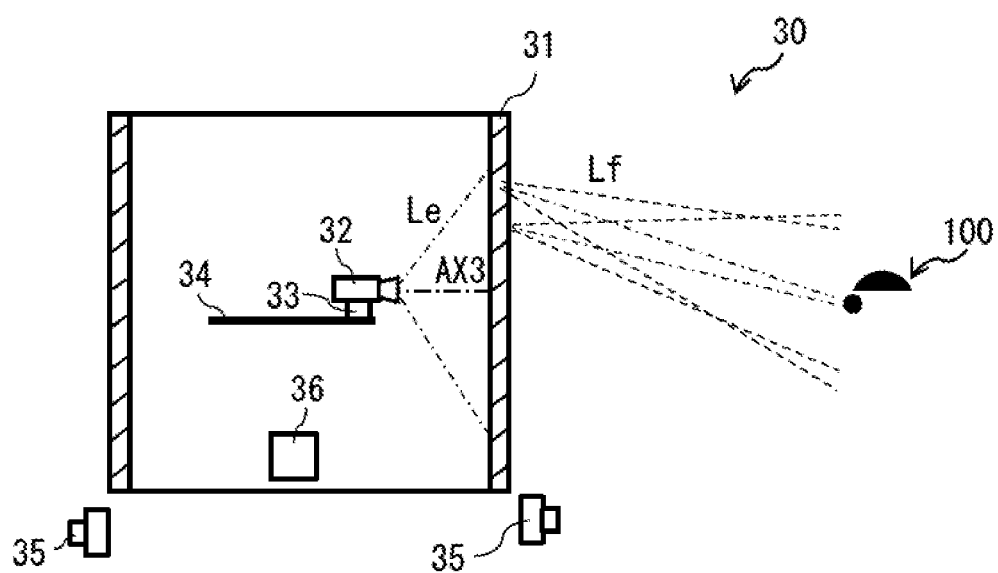

[ FIG. 17 ]
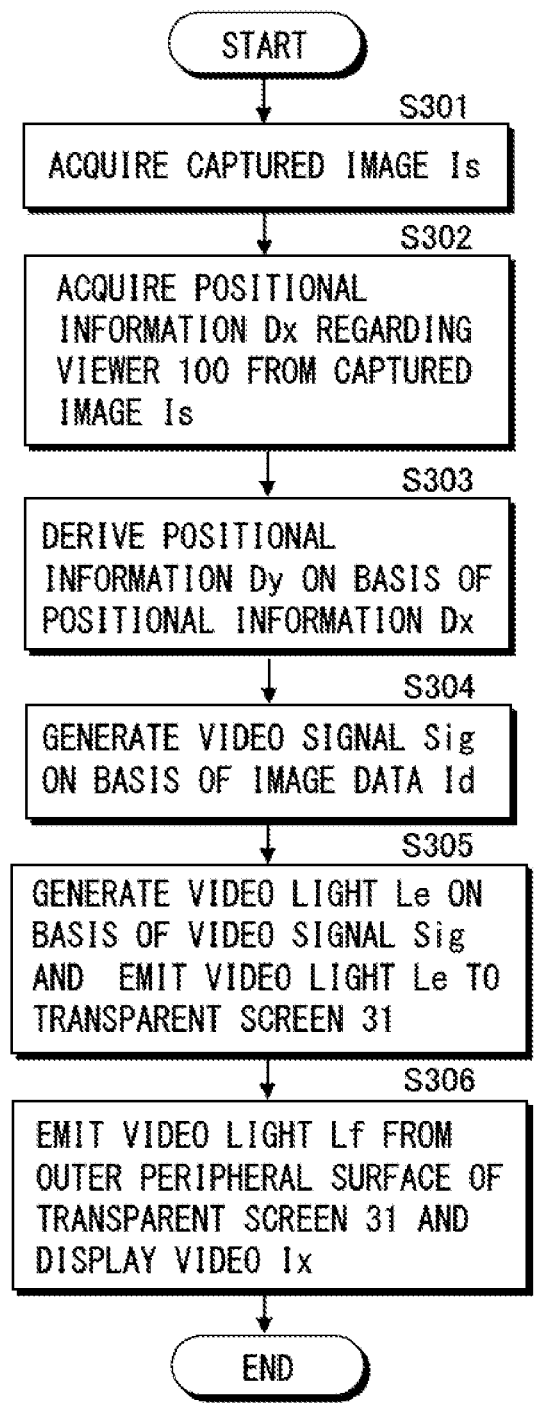

[FIG. 18]
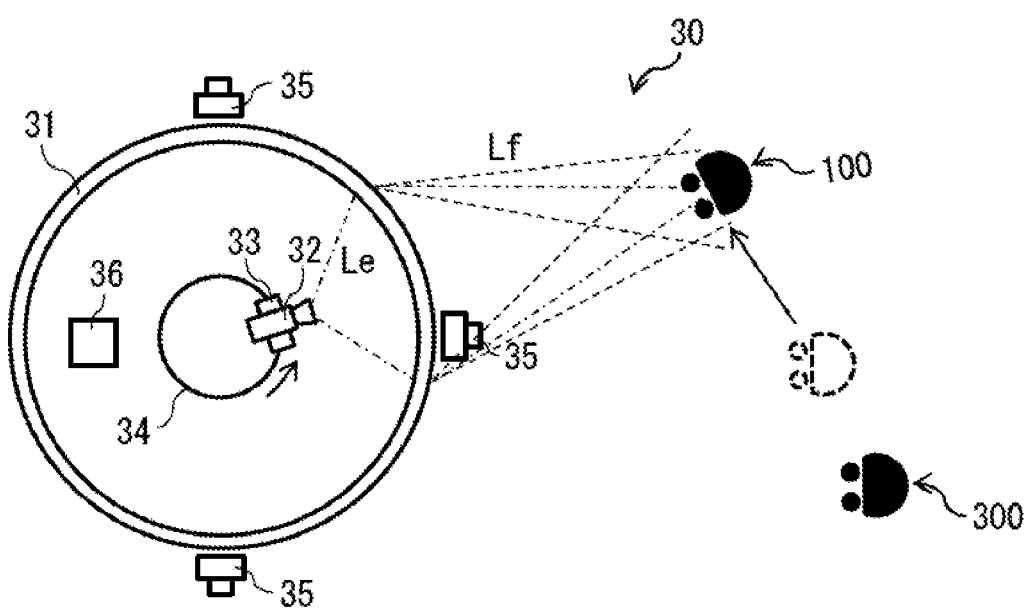

[ FIG. 19 ]
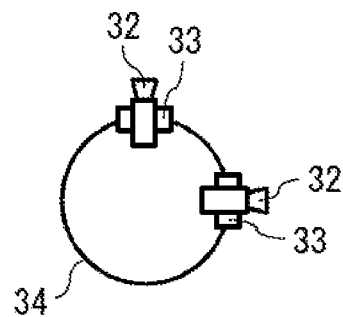
[ FIG. 20 ]
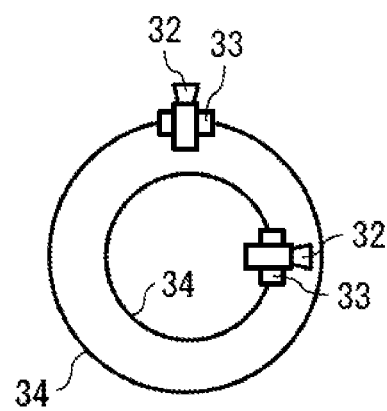
[ FIG. 21 ]
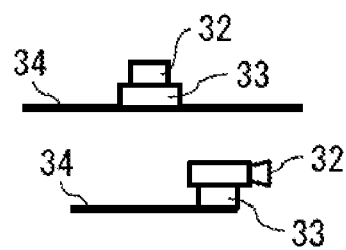

DISPLAY DEVICE

CROSS REFERENCE TO RELATED APPLICATIONS

This application is a U.S. National Phase of International Patent Application No. PCT/JP2019/043628 filed on Nov. 7, 2019, which claims priority benefit of Japanese Patent Application No. JP 2018-230114 filed in the Japan Patent Office on Dec. 7, 2018. Each of the above-referenced applications is hereby incorporated herein by reference in its entirety.

TECHNICAL FIELD

The present disclosure relates to a display device that is able to display video on a transparent screen.

BACKGROUND ART

For example, PTL 1 discloses a display device that displays video on a transparent screen.

CITATION LIST

Patent Literature

PTL 1: Japanese Unexamined Patent Application Publication No. 2016-1211

SUMMARY OF THE INVENTION

In the field of the display device described above, it is necessary to narrow the diffusion angle range to some degree to maintain the transparency of the transparent screen. However, in such a case, there is an issue with the difficulty in visually recognizing video once a viewer goes away from a specific place. A display device is therefore provided that allows video to be visually recognized regardless of a place while maintaining the transparency of the transparent screen.

A display device according to an embodiment of the present disclosure includes: a transparent screen; one or more imaging units; and a video projection unit that acquires positional information regarding a predetermined subject included in each of captured images obtained by the one or more imaging units and then irradiates the transparent screen with video light on the basis of the positional information to cause predetermined video to appear on the transparent screen for the subject.

The display device according to the embodiment of the present disclosure irradiates the transparent screen with the video light on the basis of the positional information to cause the predetermined video to appear on the transparent screen for the subject. This causes the predetermined video to appear on the transparent screen in accordance with the position of the subject.

BRIEF DESCRIPTION OF DRAWING

FIG. 1 is a diagram illustrating an example of a top configuration of a display device according to a first embodiment of the present disclosure.

FIG. 2 is a diagram illustrating an example of a cross-sectional configuration of the display device in FIG. 1.

FIG. 3A is a diagram illustrating an example of a cross-sectional configuration of a transparent screen in FIG. 1; and FIG. 3B is a diagram illustrating a transmission-type model of the transparent screen in FIG. 3A.

FIG. 4 is a diagram illustrating an example of video that is displayed on the transparent screen in FIG. 1.

FIG. 5 is a diagram illustrating an example of an operation procedure flow of the display device in FIG. 1.

FIG. 6 is a diagram illustrating that a viewer moves.

FIG. 7 is a diagram illustrating an example of video that is displayed in the transparent screen in a case where the viewer moves.

FIG. 8 is a diagram illustrating an example of a top configuration of a display device according to a second embodiment of the present disclosure.

FIG. 9 is a diagram illustrating an example of a side configuration of the display device in FIG. 8.

FIG. 10 is a diagram illustrating an example of dependency of diffraction efficiency of the transparent screen in FIG. 8 on an angle of incidence.

FIG. 11 is a diagram illustrating an example of dependency of diffraction efficiency of the transparent screen in FIG. 8 on a wavelength.

FIG. 12 is a diagram illustrating an example of an operation procedure flow of the display device in FIG. 8.

FIG. 13 is a diagram illustrating that the projector in FIG. 8 is moved.

FIG. 14 is a diagram illustrating that the projector in FIG. 9 is moved.

FIG. 15 is a diagram illustrating an example of a top configuration of a display device according to a third embodiment of the present disclosure.

FIG. 16 is a diagram illustrating an example of a cross-sectional configuration of the display device in FIG. 15.

FIG. 17 is a diagram illustrating an example of a cross-sectional configuration of a transparent screen in FIG. 15.

FIG. 18 is a diagram illustrating that the projector in FIG. 15 is moved.

FIG. 19 is a diagram illustrating an example of a configuration of a rail in a case where the display device in FIG. 15 is provided with a plurality of projectors.

FIG. 20 is a diagram illustrating an example of the configuration of the rail in a case where the display device in FIG. 15 is provided with the plurality of projectors.

FIG. 21 is a diagram illustrating an example of the configuration of the rail in a case where the display device in FIG. 15 is provided with the plurality of projectors.

MODES FOR CARRYING OUT THE INVENTION

The following describes modes for carrying out the present disclosure in detail with reference to the drawings. It is to be noted that description is given in the following order.

1. First Embodiment (FIGS. 1, 2, 3A, 3B, 4, 5, 6, and 7)
    Example in which the whole of a transparent screen having the shape of a cylinder is irradiated with video light
2. Second Embodiment (FIGS. 8 to 14)
    Example in which a transparent screen having the shape of a sheet is irradiated with video light
3. Third Embodiment (FIGS. 15 to 18)
    Example in which a portion of a transparent screen having the shape of a cylinder is irradiated with video light
4. Modification Example (FIG. 19 to FIG. 21)
    Example of a configuration of a rail in a case where there is provided a plurality of projectors

1. First Embodiment

[Configuration]

FIG. 1 illustrates an example of a top configuration of a display device 10 according to a first embodiment of the present disclosure. FIG. 2 illustrates an example of a cross-sectional configuration of the display device 10 according to the present embodiment. The display device 10 includes a transparent screen 11 having the shape of a cylinder. For example, the display device 10 displays video on the whole of the outer peripheral surface of the transparent screen 11.

The transparent screen 11 includes, for example, one HOE (Holographic Optical Element; holographic optical element) film. The HOE film includes, for example, a volume hologram of a transmission type. The HOE film has functions of diffracting and diffusing light (video light La described below) on the outer peripheral surface side of the HOE film. The video light La has entered the inner peripheral surface of the HOE film. The diffusion angle (the diffusion angle of video light Lc described below) of the transparent screen 11 is narrow in the horizontal direction (left/right direction) as compared with the vertical direction (up/down direction). This allows the transparent screen 11 to make, for example, only a desired viewer 100 selectively recognize predetermined video (video that is generated by video light Lc1) visually.

The transparent screen 11 may include two HOE films 11a and 11b and a transparent film 11c that is sandwiched by these HOE films 11a and 11b, for example, as illustrated in FIG. 3A. The HOE film 11a is disposed on the inner peripheral surface side of the transparent screen 11 and the HOE film 11b is disposed on the outer peripheral surface side of the transparent screen 11. Each of the HOE films 11a and 11b includes, for example, a volume hologram of a transmission type. The HOE film 11a further has functions of diffracting and condensing light (video light La described below) on the outer peripheral surface side of the HOE film 11a. The video light La has entered the inner peripheral surface of the HOE film 11a. In contrast, the HOE film 11b further has functions of diffracting and diffusing light on the outer peripheral surface side of the HOE film 11b. The light has entered the inner peripheral surface of the HOE film 11b. The transparent screen 11 has a double lenticular function in which focal distance f2 of a microlens 11B on the outer surface side is shorter than focal distance f1 of a microlens 11A on the inner surface side, for example, as illustrated in FIG. 3B.

The diffusion angle (the diffusion angle of the video light Lc described below) of the transparent screen 11 (e.g., HOE film 11b) is narrow in the horizontal direction (left/right direction) as compared with the vertical direction (up/down direction). This allows the transparent screen 11 to make, for example, only the desired viewer 100 selectively recognize predetermined video (video that is generated by the video light Lc1) visually.

The display device 10 further includes a projector 12, a mirror 13, a plurality of cameras 14, and a controller 15. The plurality of cameras 14 corresponds a specific example of a "plurality of imaging units" of the present disclosure. The controller 15 corresponds to a specific example of a "generator" of the present disclosure. A module including the projector 12, the mirror 13, and the controller 15 corresponds to a specific example of a "video projection unit" of the present disclosure. The module described above acquires positional information Dx regarding a predetermined subject included in a captured image Is obtained by each of the cameras 14 and then irradiates the transparent screen 11 with the video light La on the basis of the positional information Dx to cause predetermined video Ix to appear on the transparent screen 11 for the subject.

The projector 12 generates the video light La on the basis of a video signal Sig inputted from the controller 15 and irradiates the mirror 13 with the generated video light La. The projector 12 emits the video light La to cause the video light La to pass through a central axis AX1 of the transparent screen 11 having the shape of a cylinder. The projector 12 is disposed, for example, to cause the central axis of the video light La to coincide with the central axis AX1 of the transparent screen 11. The projector 12 includes, for example, a video signal processing circuit, a laser drive circuit, a light source unit, a scanner unit, and a scanner drive circuit.

The video signal processing circuit generates a projection video signal for each color on the basis of the video signal Sig. On the basis of the projection video signal for each color, the laser drive circuit controls the peak value of a current pulse to be applied to the light source unit. The light source unit includes, for example, a laser light source that emits red laser light, a laser light source that emits green laser light, and a laser light source that emits blue laser light. The video signal processing circuit then generates a projection video signal for red, a projection video signal for green, and a projection video signal for blue on the basis of the video signal Sig. On the basis of the projection video signal for red, the video signal processing circuit controls the peak value of a current pulse that is applied to the laser light source which emits red laser light. On the basis of the projection video signal for green, the video signal processing circuit controls the peak value of a current pulse that is applied to the laser light source which emits green laser light. On the basis of the projection video signal for blue, the video signal processing circuit controls the peak value of a current pulse that is applied to the laser light source which emits blue laser light.

In a light source unit, the respective pieces of laser light are collimated, for example, by a collimating lens as pieces of substantially parallel light. The pieces of substantially parallel light are then bundled by a beam splitter or the like into one ray of laser light. Laser light transmitted and reflected by a beam splitter or the like enters the scanner unit. The scanner unit includes, for example, one two-axis scanner. The irradiation angle of the incident laser light is modulated by the two-axis scanner in the horizontal and vertical directions. The mirror 13 is then irradiated with the laser light. It is to be noted that the scanner unit may have a configuration in which two single-axis scanners are used to perform scanning in the horizontal direction and the vertical direction.

In general, the scanner unit includes a sensor that detects the irradiation angle of the two-axis scanner or the like. The sensor outputs an angle signal for each of the horizontal and vertical directions. These angle signals are inputted to the scanner drive circuit. The scanner drive circuit drives the scanner unit to obtain a desired irradiation angle, for example, on the basis of a horizontal angle signal and a vertical angle signal that are inputted from the scanner unit. It is to be noted that the projector 12 is not limited to the configuration described above. The projector 12 may have a configuration different from the configuration described above.

The mirror 13 is provided to close the opening of the upper end portion of the transparent screen 11. The mirror 13 is in contact with the upper end portion of the transparent screen 11 at the end of the mirror 13. In other words, the mirror 13 is supported by the transparent screen 11. The mirror 13 reflects the video light La generated by the projector 12, by irradiating the transparent screen 11 with the video light La. The mirror 13 irradiated with the video light La from the projector 12 reflects the video light La to the inner peripheral surface of the transparent screen 11. The reflected light generated by the mirror 13 enters the inner peripheral surface of the transparent screen 11.

The mirror 13 omnidirectionally reflects the video light La emitted from the projector 12 at 360° around the central axis AX1 of the transparent screen 11 having the shape of a cylinder, thereby irradiating the transparent screen 11 with the video light La. At least a portion of the mirror 13 that reflects the video light La has a point-symmetrical shape around a portion intersecting the central axis AX1. At least the portion of the mirror 13 that reflects the video light La has a protruding section that protrudes the most toward the projector 12 side, for example, at the portion intersecting the central axis AX1. A surface 13s of this protruding section on the projector 12 side is, for example, a recessed parabolic curve that omnidirectionally extends at 360° from the portion intersecting the central axis AX1.

Each camera 14 images the region around the transparent screen 11 in accordance with the control from the controller 15 and outputs the resultant captured image Is to the controller 15. Each of the cameras 14 includes, for example, a CCD (Charge Coupled Device) image sensor, a CMOS (Complementary Metal Oxide Semiconductor) image sensor, or the like. The plurality of cameras 14 is disposed at positions that allow, for example, the whole of the region around the transparent screen 11 to be imaged (i.e., omnidirectionally at 360° around the transparent screen 11). In a case where the display device 10 includes the four cameras 14, the four cameras 14 are disposed to have the direction of 0°, the direction of 90°, the direction of 180°, and the direction of 270° around the transparent screen 11 as the imaging directions, for example, as illustrated in FIG. 1. It is to be noted that the number of cameras 14 and the disposition of the cameras 14 are not limited to those described above.

The controller 15 controls each camera 14. The controller 15 further acquires the positional information Dx regarding a predetermined subject included in the captured image Is obtained from each camera 14 and generates the video signal Sig on the basis of the acquired positional information Dx and image data Id. For example, the controller 15 may input the captured image Is obtained from each camera 14 to a predetermined learning model and acquire the positional information Dx regarding the predetermined subject from the learning model. For example, the controller 15 may acquire the positional information Dx regarding the predetermined subject included in the captured image Is by performing predetermined image processing on the captured image Is obtained from each camera 14.

The subject is, for example, the viewer 100. The viewer 100 is not particularly limited. The viewer 100 may be a pedestrian or a person in a wheelchair or the like. The viewer 100 may walk around the transparent screen 11 or stop around the transparent screen 11. The subject is not limited to a person such as the viewer 100, but may be, for example, a mobile body such as a car or a bicycle or a fixed object such as a specific shop or a pedestrian traffic light.

The image data Id is data that is used to generate predetermined video (that is referred to as "video Ix" below) for a subject. In other words, the image data Id is data corresponding to the video Ix. The image data Id may be inputted from the outside via a communication unit (not illustrated) provided in the display device 10 or read out from a storage unit (not illustrated) provided in the display device 10. The image data Id may be still image data or moving image data.

The controller 15 derives, from the positional information Dx, a region (that is referred to as "region Rx" below) of the transparent screen 11 in which the video Ix corresponding to the image data Id is displayed. The controller 15 further generates the video signal Sig to cause the video Ix to appear in the region Rx for a subject. In other words, the controller 15 generates the video signal Sig on the basis of the positional information Dx to cause the video Ix to appear in the region Rx for a subject. The controller 15 then generates the video signal Sig to cause the video Ix to be displayed in the derived region Rx and cause video Iy different from the video Ix to be displayed around the derived region Rx. The video Iy may be, for example, video having a gradation lower than the maximum gradation of the video Ix. Examples of the video having a gradation lower than the maximum gradation of the video Ix include video of concrete, black video, and the like.

The controller 15 generates the video signal Sig on the basis of the image data Id and image data Ie. The image data Ie is data that is used to generate the video Iy. The image data Ie is, for example, data that is used to generate video having a gradation lower than the maximum gradation of the video Ix. Example of the image data Ie include data that is used to generate video of concrete, black video, or the like. The image data Ie is stored in advance, for example, in a storage unit (not illustrated) provided in the display device 10.

The controller 15 outputs the generated video signal Sig to the projector 12. The video light La that is generated on the basis of the video signal Sig in the projector 12 includes video light La1 and video light La2. In other words, the projector 12 generates the video light La including the video light La1 and the video light La2 on the basis of the video signal Sig and irradiates the transparent screen 11 with the generated video light La via the mirror 13. The video light La1 is for displaying the video Ix in the region Rx of the transparent screen 11. The video light La1 is generated on the basis of the image data Id. The video light La2 is for displaying the video Iy in a region Ry of the transparent screen 11. The video light La2 is generated on the basis of the image data Ie. The gradation of the video light La2 is lower than the maximum gradation of the video light La1.

Here, it is assumed that the video light La2 is black-colored light. In a case where the reflected light of the video light La including the pieces of video light La1, and La2 then enters the inner peripheral surface of the transparent screen 11, the video light Lc including the video light Lc1 corresponding to the video light La1 and video light Lc2 (black-colored light) corresponding to the video light La2 is emitted from the outer peripheral surface of the transparent screen 11, for example, as illustrated in FIG. 4. The viewer 100 then visually recognizes the video Ix appearing in the region Rx of the transparent screen 11 from which the video light Lc1 is emitted and visually recognizes the video Iy (black video) appearing in the region of the transparent screen 11 from which the video light Lc2 is emitted. Meanwhile, a viewer 200 present next to the viewer 100 is not able to visually recognize the video Ix, but visually recognizes the video Iy (black video) appearing on the transparent screen 11. It is to be noted that FIG. 4 illustrates that the viewer 100 visually recognizes the video Ix, but a viewer present in the direction vertical to the diagram is not then able to visually recognize the video Ix.

[Operation]

Next, an operation of the display device 10 according to the present embodiment is described. FIG. 5 illustrates an operation procedure flow of the display device 10.

First, it is assumed that the viewers 100, 200, and 300 are present around the transparent screen 11. Each of the cameras 14 then periodically images the region around the transparent screen 11 and acquires the captured image Is in accordance with the control by the controller 15 (step S101). The controller 15 detects that the viewer 100 is included in the captured image Is obtained from each camera 14. The controller 15 acquires the positional information Dx regarding the detected viewer 100 from the captured image Is obtained from each camera 14 (step S102).

The controller 15 generates the video signal Sig on the basis of the acquired positional information Dx and the pieces of image data Id and Ie (step S103). The projector 12 generates the video light La on the basis of the video signal Sig and emits the video light La to the mirror 13 (step S104). The video light La is reflected by the mirror 13 and enters the inner peripheral surface of the transparent screen 11. The video light La entering the inner peripheral surface of the transparent screen 11 is diffracted by the transparent screen 11 and emitted from the outer peripheral surface of the transparent screen 11 as the video light Lc. In other words, the display device 10 emits the video light Lc from the outer peripheral surface of the transparent screen 11, thereby displaying the pieces of video Ix and Iy (step S105).

The video light Lc1 included in the video light Lc is then emitted from the region Rx of the transparent screen 11 corresponding to the position of the viewer 100 and reaches the viewer 100. As a result, the video Ix generated by the video light Lc1 is visually recognized by the viewer 100. The video light Lc1 does not then reach the viewer 200 present near the viewer 100. Therefore, the video Ix is not visually recognized by the viewer 100.

For example, whenever the controller 15 acquires the captured image Is from each camera 14, the controller 15 generates the video signal Sig on the basis of the captured image Id obtained from each camera 14. As a result, even in a case where the viewer 100 is moving around the transparent screen 11, for example, as illustrated in FIG. 6, the display device 10 emits the video light Lc1 from the region Rx of the transparent screen 11 corresponding to the present position of the viewer 100, for example, as illustrated in FIG. 7. As a result, the video Ix is continuously recognized visually by the viewer 100 moving around the transparent screen 11. In this way, the video Ix is delivered to the viewer 100.

[Effects]

Next, effects of the display device 10 according to the present embodiment are described.

In the present embodiment, the transparent screen 11 is irradiated with the video light La via the mirror 13 on the basis of the positional information Dx to cause the video Ix to appear on the transparent screen 11 for the viewer 100. This causes the predetermined video Ix to appear on the transparent screen 11 in accordance with the position of the viewer 100. As a result, it is possible to visually recognize the video Ix regardless of a place while maintaining the transparency of the transparent screen 11.

In addition, in the present embodiment, the video light La including the video light La1 for generating the video Ix and the video light La2 for generating the video Iy different from the video Ix around the video Ix is generated by the controller 15 on the basis of the positional information Dx. The transparent screen 11 is then irradiated with the video light La generated in this way via the mirror 13. This causes the video Ix to appear on the transparent screen 11 in accordance with the position of the viewer 100. As a result, it is possible to visually recognize the video Ix regardless of a place while maintaining the transparency of the transparent screen 11.

In addition, in the present embodiment, the gradation of the video light La2 is lower than the maximum gradation of the video light La1. For example, the video light La2 is black-colored light. This facilitates the viewer 100 to pay attention to the video Ix generated on the basis of the video light La1. As a result, it is possible to increase the possibility that the viewer 100 gazes at the video Ix.

In addition, in the present embodiment, the video signal Sig is generated by the controller 15 on the basis of the positional information Dx and the image data Id corresponding to the video Ix to cause the video Ix to appear on the transparent screen 11 for the viewer 100. The video light La1 is then generated by the projector 12 on the basis of the video signal Sig generated by the controller 15. The video light La1 generated by the projector 12 is reflected by the mirror 13, thereby irradiating the transparent screen 11 with the video light La1. This causes the video Ix to appear on the transparent screen 11 in accordance with the position of the viewer 100. As a result, it is possible to visually recognize the video Ix regardless of a place while maintaining the transparency of the transparent screen 11.

In addition, in the present embodiment, the video signal Sig is generated by the controller 15 on the basis of the positional information Dx and the image data Id corresponding to the video Ix to cause the video Ix to appear on the transparent screen 11 for the viewer 100. The video light La1 is then generated by the projector 12 on the basis of the video signal Sig generated by the controller 15 and the video light La1 is emitted from the projector 12 to cause the video light La1 to pass through the central axis AX1 of the transparent screen 11 having the shape of a cylinder. Further, the video light La1 emitted from the projector 12 is omnidirectionally reflected at 360° around the central axis AX1 of the transparent screen 11 having the shape of a cylinder, thereby irradiating the transparent screen 11 with the video light La1 (video light Lb). This causes the video Ix to appear on the transparent screen 11 in accordance with the position of the viewer 100. As a result, it is possible to visually recognize the video Ix regardless of a place while maintaining the transparency of the transparent screen 11.

In addition, in the present embodiment, the transparent screen 11 is a screen having the shape of a cylinder and having a double lenticular function in which the focal distance f2 on the outer surface side is shorter than the focal distance f1 on the inner surface side. The screen includes the two holograms 11a and 11b each of which is of a transmission type. The two holograms 11a and 11b each have the shape of a cylinder. This allows the predetermined video Ix to appear on the transparent screen 11 in accordance with the position of the viewer 100. As a result, it is possible to visually recognize the video Ix regardless of a place while maintaining the transparency of the transparent screen 11.

2. Second Embodiment

Next, a display device 20 according to a second embodiment of the present disclosure is described. FIG. 8 illustrates an example of a top configuration of the display device 20. FIG. 9 illustrates an example of a side configuration of the display device 20. The display device 20 includes a transparent screen 21 having the shape of a sheet. For example, the display device 20 displays video on one of the surfaces of the transparent screen 21.

The transparent screen 21 includes a hologram of a transmission type that has the shape of a sheet. The hologram has a diffusing property to diffuse, for example, the video light Lb described below and a light condensing property to condense the video light Lb. The transparent screen 21 has dependency on an angle of incidence, for example, as illustrated in FIG. 10. The transparent screen 21 diffracts the video light Lb with the highest diffraction efficiency. The video light Lb has entered the transparent screen 21 at the angle (e.g., around 70°) for the highest diffraction efficiency, for example, in FIG. 10. The transparent screen 21 further has dependency on a wavelength, for example, as illustrated in FIG. 11. The transparent screen 21 diffracts the video light Lb with high diffraction efficiency. The video light Lb includes the wavelength band (e.g., 500-nm band) for high diffraction efficiency, for example, in FIG. 11.

The diffusion angle (the diffusion angle of video light Ld described below) of the transparent screen 21 is narrow in the horizontal direction (left/right direction) as compared with the vertical direction (up/down direction). This allows the transparent screen 21 to make, for example, only the desired viewer 100 selectively recognize predetermined video (video that is generated by the video light Ld described below) visually.

The display device 20 further includes a projector 22, a stage 23, a rail 24, a camera 25, and a controller 26. The camera 25 corresponds to a specific example of an "imaging unit" of the present disclosure. The stage 23, the rail 24, and the controller 26 each correspond to a specific example of a "moving unit" of the present disclosure. A module including the projector 22, the stage 23, the rail 24, and the controller 26 corresponds to a specific example of the "video projection unit" of the present disclosure. The module described above acquires the positional information Dx regarding a predetermined subject included in the captured image Is obtained by the camera 25 and then irradiates the transparent screen 21 with the video light Lb on the basis of the positional information Dx to cause the predetermined video Ix to appear on the transparent screen 21 for the subject.

The projector 22 generates the video light Lb on the basis of the video signal Sig inputted from the controller 26 and irradiates the transparent screen 21 with the generated video light Lb. The projector 22 is disposed to cause an optical axis AX2 of the video light Lb to obliquely intersect the transparent screen 21. The projector 22 is disposed to cause an angle θ formed between the optical axis AX2 of the video light Lb and the transparent screen 21 to be the angle (e.g., around 70°) for the highest diffraction efficiency, for example, in FIG. 10. The projector 22 has a configuration similar to that of the projector 12. The projector 22 includes, for example, a video signal processing circuit, a laser drive circuit, a light source unit, a scanner unit, and a scanner drive circuit.

The stage 23 moves on the rail 24 in accordance with a control signal from the controller 26. The stage 23 moves on the rail 24 on the basis of the positional information Dx (or positional information Dy obtained from the positional information Dx). The projector 22 is fixed to the stage 23. The stage 23 moves the position of the projector 22 on the basis of the positional information Dx (or the positional information Dy) to cause the predetermined video Ix to appear on the transparent screen 21 for the viewer 100. The stage 23 moves the position of the projector 22 to cause the angle θ formed between the optical axis AX2 of the video light Lb and the transparent screen 21 to be constant. The angle θ formed between the optical axis AX2 of the video light Lb and the transparent screen 21 is defined by the rail 24. The stage 23 thus moves on the rail 24, thereby maintaining the constant angle θ formed between the optical axis AX2 of the video light Lb and the transparent screen 21.

The camera 25 images a scene in the front direction of the transparent screen 21 in accordance with the control from the controller 26 and outputs the resultant captured image Is to the controller 26. The camera 25 includes, for example, a CCD image sensor, a CMOS image sensor, or the like. The camera 25 is disposed at a position that allows, for example, a scene in the front direction of the transparent screen 21 to be imaged. In a case where the display device 20 includes the one camera 25, the camera 25 is disposed at the lower end of the transparent screen 21, for example, as illustrated in each of FIGS. 12 and 13. It is to be noted that the number of cameras 25 and the disposition of the cameras 25 are not limited to those described above.

The controller 26 controls the camera 25. The controller 26 further acquires the positional information Dx regarding a predetermined subject included in the captured image Is obtained from the camera 25. For example, the controller 26 may input the captured image Is obtained from the camera 25 to a predetermined learning model and acquire the positional information Dx regarding the predetermined subject from the learning model. For example, the controller 26 may acquire the positional information Dx regarding the predetermined subject included in the captured image Is by performing predetermined image processing on the captured image Is obtained from the camera 25.

The image data Id is data that is used to generate the video Ix. In other words, the image data Id is data corresponding to the video Ix. The image data Id may be inputted from the outside via a communication unit (not illustrated) provided in the display device 20 or read out from a storage unit (not illustrated) provided in the display device 20. The image data Id may be still image data or moving image data.

The controller 26 derives, from the positional information Dx, the positional information Dy regarding the projector 22 (or the stage 23) that emits the video light Lb. The controller 26 generates a control signal on the basis of the derived positional information Dy and outputs the generated control signal to the stage 23. The controller 26 further generates the video signal Sig to cause the video Ix corresponding to the image data Id to appear on the transparent screen 21. In other words, the controller 26 generates the positional information Dy regarding the projector 22 (or the stage 23) on the basis of the positional information Dx to cause the video Ix to appear on the transparent screen 21 for a subject.

The controller 26 generates the video signal Sig on the basis of the image data Id. The controller 26 outputs the generated video signal Sig to the projector 22. The video light Ld generated by the projector 22 on the basis of the video signal Sig is for displaying the video Ix corresponding to the image data Id on the transparent screen 21.

[Operation]

Next, an operation of the display device 20 according to the present embodiment is described. FIG. 12 illustrates an operation procedure flow of the display device 20.

First, it is assumed that the viewers 100, 200, and 300 are present around the transparent screen 21. The camera 25 then periodically images a scene in the front direction of the transparent screen 21 and acquires the captured image Is in accordance with the control by the controller 26 (step S201). The controller 26 detects that the viewer 100 is included in the captured image Is obtained from the camera 25. The controller 26 acquires the positional information Dx regarding the detected viewer 100 from the captured image Is obtained from the camera 25 (step S202).

The controller 26 derives, on the basis of the acquired positional information Dx, the positional information Dy regarding the projector 22 (or the stage 23) that emits the video light Lb (step S203). The controller 26 further generates the video signal Sig on the basis of the image data Id (step S204). The projector 22 generates the video light Lb on the basis of the video signal Sig and emits the video light Lb to the transparent screen 21 (step S205). The video light Lb enters the back surface of the transparent screen 21. The video light Lb entering the back surface of the transparent screen 21 is diffracted by the transparent screen 21 and emitted from the front surface of the transparent screen 21 as the video light Ld. In other words, the display device 20 emits the video light Ld from the front surface of the transparent screen 21, thereby displaying the video Ix (step S206).

The video light Ld is then emitted from the front surface of the transparent screen 21 and reaches the viewer 100. As a result, the video Ix generated by the video light Ld is visually recognized by the viewer 100. The video light Ld does not then reach the viewer 200 present near the viewer 100. Therefore, the video Ix is not visually recognized by the viewer 100.

For example, whenever the controller 26 acquires the captured image Is from the camera 25, the controller 26 generates the video signal Sig on the basis of the captured image Id obtained from the camera 25. As a result, even in a case where the viewer 100 is moving around the transparent screen 21, for example, as illustrated in FIG. 13, the display device 20 moves the projector 22 (or the stage 23) to a position corresponding to the present position of the viewer 100 and then emits the video light Ld, for example, as illustrated in each of FIGS. 13 and 14. As a result, the video Ix is continuously recognized visually by the viewer 100 moving around the transparent screen 21. In this way, the video Ix is delivered to the viewer 100.

[Effects]

Next, effects of the display device 20 according to the present embodiment are described.

In the present embodiment, the transparent screen 21 is irradiated with the video light Lb on the basis of the positional information Dx to cause the video Ix to appear on the transparent screen 21 for the viewer 100. This causes the predetermined video Ix to appear on the transparent screen 21 in accordance with the position of the viewer 100. As a result, it is possible to visually recognize the video Ix regardless of a place while maintaining the transparency of the transparent screen 21.

In addition, in the present embodiment, the video light Lb for generating the predetermined video Ix is generated by the projector 22 and the transparent screen 21 is irradiated with the generated video light Lb. The position of the projector 22 (or the stage 23) is then moved on the basis of the positional information Dx to cause the predetermined video Ix to appear on the transparent screen 21 for a subject. This causes the predetermined video Ix to appear on the transparent screen 21 in accordance with the position of the viewer 100. As a result, it is possible to visually recognize the video Ix regardless of a place while maintaining the transparency of the transparent screen 21.

In addition, in the present embodiment, the transparent screen 21 includes a hologram of a transmission type that has the shape of a sheet. The hologram has a diffusing property to diffuse the video light Lb and a light condensing property to condense the video light Lb. This allows the predetermined video Ix to appear on the transparent screen 21 in accordance with the position of the viewer 100. As a result, it is possible to visually recognize the video Ix regardless of a place while maintaining the transparency of the transparent screen 21.

In addition, in the present embodiment, the projector 22 is disposed to cause the optical axis AX2 of the video light Lb to obliquely intersect the transparent screen 21. Further, the position of the projector 22 is moved by the stage 23 to cause the angle θ formed between the optical axis AX2 of the video light Lb and the transparent screen 21 to be constant. This allows the predetermined video Ix to appear on the transparent screen 21 in accordance with the position of the viewer 100. As a result, it is possible to visually recognize the video Ix regardless of a place while maintaining the transparency of the transparent screen 21.

3. Third Embodiment

Next, a display device 30 according to a third embodiment of the present disclosure is described. FIG. 15 illustrates an example of a top configuration of the display device 30. FIG. 16 illustrates an example of a cross-sectional configuration of the display device 30. The display device 30 includes a transparent screen 31 having the shape of a cylinder. For example, the display device 30 displays video on the outer peripheral surface of the transparent screen 31. The transparent screen 31 has the same configuration, for example, as that of the transparent screen 11 described above. The transparent screen 31 has a double lenticular function in which the focal distance f2 of the microlens 11B on the outer surface side is shorter than the focal distance f1 of the microlens 11A on the inner surface side, for example, as with the transparent screen 11 illustrated in FIG. 3B.

The diffusion angle (the diffusion angle of video light Lf described below) of the transparent screen 31 (e.g., HOE film 11b) is narrow in the horizontal direction (left/right direction) as compared with the vertical direction (up/down direction). This allows the transparent screen 31 to make, for example, only a desired viewer 100 selectively recognize predetermined video (video that is generated by the video light Lf) visually.

The display device 30 further includes a projector 32, a stage 33, a rail 34, a plurality of cameras 35, and a controller 36. The plurality of cameras 35 corresponds a specific example of the "plurality of imaging units" of the present disclosure. The stage 33, the rail 34, and the controller 36 each correspond to a specific example of the "moving unit" of the present disclosure. A module including the projector 32, the stage 33, the rail 34, and the controller 36 corresponds to a specific example of the "video projection unit" of the present disclosure. The module described above acquires the positional information Dx regarding a predetermined subject included in the captured image Is obtained by each of the cameras 35 and then irradiates the transparent screen 31 with video light Le on the basis of the positional information Dx to cause the predetermined video Ix to appear on the transparent screen 31 for the subject.

The projector 32 generates the video light Le on the basis of the video signal Sig inputted from the controller 36 and irradiates the transparent screen 31. The projector 32 is disposed, for example, to cause an optical axis AX3 of the video light Le to be orthogonal to the transparent screen 31. The projector 32 is disposed to cause the angle θ formed between the optical axis AX3 of the video light Le and the transparent screen 31 to be orthogonal. The projector 32 has a configuration similar to that of the projector 12. The projector 32 includes, for example, a video signal processing circuit, a laser drive circuit, a light source unit, a scanner unit, and a scanner drive circuit.

The stage 33 moves on the rail 34 in accordance with a control signal from the controller 36. The stage 33 moves on the rail 34 on the basis of the positional information Dx (or positional information Dy obtained from the positional information Dx). The projector 32 is fixed to the stage 33. The stage 33 moves the position of the projector 32 on the basis of the positional information Dx (or the positional information Dy) to cause the predetermined video Ix to appear on the transparent screen 31 for the viewer 100. The stage 33 moves the position of the projector 32 to cause the angle θ formed between the optical axis AX3 of the video light Le and the transparent screen 31 to be constant. The angle θ formed between the optical axis AX3 of the video light Le and the transparent screen 31 is defined by the rail 34. The stage 33 thus moves on the rail 34, thereby maintaining the constant angle θ formed between the optical axis AX3 of the video light Le and the transparent screen 31.

Each camera 35 images the region around the transparent screen 31 in accordance with the control from the controller 36 and outputs the resultant captured image Is to the controller 36. Each of the cameras 35 includes, for example, a CCD image sensor, a CMOS image sensor, or the like. The plurality of cameras 35 is disposed at positions that allow, for example, the whole of the region around the transparent screen 31 to be imaged (i.e., omnidirectionally at 360° around the transparent screen 31). In a case where the display device 30 includes the four cameras 35, the four cameras 35 are disposed to have the direction of 0°, the direction of 90°, the direction of 180°, and the direction of 270° around the transparent screen 31 as the imaging directions, for example, as illustrated in FIG. 15. It is to be noted that the number of cameras 35 and the disposition of the cameras 35 are not limited to those described above.

The controller 36 controls each camera 35. The controller 36 further acquires the positional information Dx regarding a predetermined subject included in the captured image Is obtained from each camera 35. For example, the controller 36 may input the captured image Is obtained from each camera 35 to a predetermined learning model and acquire the positional information Dx regarding the predetermined subject from the learning model. For example, the controller 36 may acquire the positional information Dx regarding the predetermined subject included in the captured image Is by performing predetermined image processing on the captured image Is obtained from each camera 35.

The image data Id is data that is used to generate the video Ix. In other words, the image data Id is data corresponding to the video Ix. The image data Id may be inputted from the outside via a communication unit (not illustrated) provided in the display device 30 or read out from a storage unit (not illustrated) provided in the display device 30. The image data Id may be still image data or moving image data.

The controller 36 derives, from the positional information Dx, the positional information Dy regarding the projector 32 (or the stage 33) that emits the video light Le. The controller 36 generates a control signal on the basis of the derived positional information Dy and outputs the generated control signal to the stage 33. The controller 36 further generates the video signal Sig to cause the video Ix corresponding to the image data Id to appear on the transparent screen 31. In other words, the controller 36 generates the positional information Dy regarding the projector 32 (or the stage 33) on the basis of the positional information Dx to cause the video Ix to appear on the transparent screen 31 for a subject.

The controller 36 generates the video signal Sig on the basis of the image data Id. The controller 36 outputs the generated video signal Sig to the projector 32. The video light Le generated by the projector 32 on the basis of the video signal Sig is for displaying the video Ix corresponding to the image data Id on the transparent screen 31.

[Operation]

Next, an operation of the display device 30 according to the present embodiment is described. FIG. 17 illustrates an operation procedure flow of the display device 30.

First, it is assumed that the viewers 100, 200, and 300 are present around the transparent screen 31. Each of the cameras 35 then periodically images the region around the transparent screen 31 and acquires the captured image Is in accordance with the control by the controller 36 (step S301). The controller 36 detects that the viewer 100 is included in the captured image Is obtained from each camera 35. The controller 36 acquires the positional information Dx regarding the detected viewer 100 from the captured image Is obtained from each camera 35 (step S302).

The controller 36 derives, on the basis of the acquired positional information Dx, the positional information Dy regarding the projector 32 (or the stage 33) that emits the video light Le (step S303). The controller 36 further generates the video signal Sig on the basis of the image data Id (step S304). The projector 32 generates the video light Le on the basis of the video signal Sig and emits the video light Le to the transparent screen 31 (step S305). The video light Le enters the inner peripheral surface of the transparent screen 31. The video light Le entering the inner peripheral surface of the transparent screen 31 is diffracted by the transparent screen 31 and emitted from the outer peripheral surface of the transparent screen 31 as the video light Lf. In other words, the display device 30 emits the video light Lf from the outer peripheral surface of the transparent screen 31, thereby displaying the video Ix (step S306).

The video light Lf is then emitted from the outer peripheral surface of the transparent screen 31 and reaches the viewer 100. As a result, the video Ix generated by the video light Lf is visually recognized by the viewer 100. The video light Lf does not then reach the viewer 200 present near the viewer 100. Therefore, the video Ix is not visually recognized by the viewer 100.

For example, whenever the controller 36 acquires the captured image Is from each camera 35, the controller 36 generates the video signal Sig on the basis of the captured image Id obtained from each camera 35. As a result, even in a case where the viewer 100 is moving around the transparent screen 31, for example, as illustrated in FIG. 18, the display device 30 moves the projector 32 (or the stage 33) to a position corresponding to the present position of the viewer 100 and then emits the video light Lf, for example, as illustrated in FIG. 18. As a result, the video Ix is continuously recognized visually by the viewer 100 moving around the transparent screen 31. In this way, the video Ix is delivered to the viewer 100.

[Effects]

Next, effects of the display device 30 according to the present embodiment are described.

In the present embodiment, the transparent screen 31 is irradiated with the video light Le on the basis of the positional information Dx to cause the video Ix to appear on the transparent screen 31 for the viewer 100. This causes the predetermined video Ix to appear on the transparent screen 31 in accordance with the position of the viewer 100. As a result, it is possible to visually recognize the video Ix regardless of a place while maintaining the transparency of the transparent screen 31.

In addition, in the present embodiment, the video light Le for generating the predetermined video Ix is generated by the projector 32 and the transparent screen 31 is irradiated with the generated video light Le. The position of the projector 32 (or the stage 33) is then moved on the basis of the positional information Dx to cause the predetermined video Ix to appear on the transparent screen 31 for a subject. This causes the predetermined video Ix to appear on the transparent screen 31 in accordance with the position of the viewer 100. As a result, it is possible to visually recognize the video Ix regardless of a place while maintaining the transparency of the transparent screen 31.

In addition, in the present embodiment, the transparent screen 31 is a screen having the shape of a cylinder and having a double lenticular function in which the focal distance f2 on the outer surface side is shorter than the focal distance f1 on the inner surface side. The screen includes the two HOE films 11*a* and 11*b* each of which is of a transmission type. The two HOE films 11*a* and 11*b* each have the shape of a cylinder. This allows the predetermined video Ix to appear on the transparent screen 31 in accordance with the position of the viewer 100. As a result, it is possible to visually recognize the video Ix regardless of a place while maintaining the transparency of the transparent screen 31.

4. Modification Example

In the third embodiment, the plurality of projectors 32 may be provided. For example, as illustrated in FIG. 19, the plurality of projectors 32 may be then disposed on the common rail 34 via the stage 33. In addition, for example, as illustrated in FIG. 20, some projectors 32 among the plurality of projectors 32 may be disposed on the common rail 34 having a relatively large diameter via the stage 33 and the remaining projectors 32 may be disposed on the common rail 34 having a relatively small diameter via the stage 33. In addition, for example, as illustrated in FIG. 21, some projectors 32 among the plurality of projectors 32 may be disposed on the common rail 34 disposed relatively on the upper side via the stage 33 and the remaining projectors 32 may be disposed on the common rail 34 disposed relatively on the lower side via the stage 33.

As described above, the present disclosure has been described with reference to the plurality of embodiments and the modification example thereof, but the present disclosure is not limited to the embodiments or the like described above. A variety of modifications are possible. It is to be noted that the effects described herein are merely illustrative. The effects of the present disclosure are not limited to the effects described herein. The present disclosure may have effects other than the effects described herein.

In addition, for example, it is possible to configure the present disclosure as follows.

(1)

A display device including:

a transparent screen;

one or more imaging units; and a video projection unit that acquires positional information regarding a predetermined subject included in each of captured images obtained by the one or more imaging units and then irradiates the transparent screen with video light on the basis of the positional information to cause predetermined video to appear on the transparent screen for the subject.

(2)

The display device according to (1), in which the video projection unit generates video light including first video light and second video light as the video light on the basis of the positional information and irradiates the transparent screen with the generated video light, the first video light being for generating the predetermined video, the second video light being for generating video different from the predetermined video around the predetermined video.

(3)

The display device according to (2), in which a gradation of the second video light is lower than a maximum gradation of the first video light.

(4)

The display device according to (2), in which the second video light includes black-colored light.

(5)

The display device according to any one of (1) to (5), in which the video projection unit includes a generator that generates a video signal on the basis of the positional information and image data corresponding to the predetermined video to cause the predetermined video to appear on the transparent screen for the subject, a projector that generates the video light on the basis of the video signal generated by the generator, and a mirror that reflects the video light generated by the projector, thereby irradiating the transparent screen with the video light.

(6)

The display device according to any one of (1) to (5), in which the transparent screen includes a hologram of a transmission type, the hologram having a shape of a cylinder and having a diffusing property to diffuse the video light, and the video projection unit includes a generator that generates a video signal on the basis of the positional information and image data corresponding to the predetermined video to cause the predetermined video to appear on the transparent screen for the subject, a projector that generates the video light on the basis of the video signal generated by the generator and emits the video light to cause the video light to pass through a central axis of the hologram having the shape of the cylinder, and a mirror that omnidirectionally reflects the video light at 360° around the central axis of the hologram, thereby irradiating the transparent screen with the video light, the video light being emitted from the projector.

(7)

The display device according to (1), in which the video projection unit includes a projector that generates first video light as the video light and irradiates the transparent screen with the generated first video light, the first video light being for generating the predetermined video, and a moving unit that moves a position of the projector on the basis of the positional information to cause the predetermined video to appear on the transparent screen for the subject.

(8)

The display device according to (7), in which the transparent screen includes a hologram of a transmission type, the hologram having a shape of a sheet and having a diffusing property to diffuse the video light and a light condensing property to condense the video light.

(9)

The display device according to (8), in which the projector is disposed to cause an optical axis of the video light to obliquely intersect the transparent screen, and the moving unit moves the position of the projector to cause an angle formed between the optical axis of the video light and the transparent screen to be constant.

(10)

The display device according to (7), in which the transparent screen includes a screen having a shape of a cylinder and having a double lenticular function in which focal distance on an outer surface side is shorter than focal distance on an inner surface side, the screen including two holograms each of which is of a transmission type, the two holograms each having a shape of a cylinder.

The display device according to the embodiment of the present disclosure irradiates the transparent screen with the video light on the basis of the positional information to cause the predetermined video to appear on the transparent screen for the subject. This makes it possible to visually recognize the video regardless of a place while maintaining the transparency of the transparent screen. It is to be noted that the effects of the present disclosure are not necessarily limited to the effects described here, but may include any of the effects described herein.

This application claims the priority on the basis of Japanese Patent Application No. 2018-230114 filed on Dec. 7, 2018 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device, comprising:

a transparent screen;

at least one imaging unit; and a video projection device configured to:

acquire positional information regarding a specific subject included in each of captured images obtained by the at least one imaging unit, and irradiate the transparent screen with video light based on the positional information to cause a specific video to appear on the transparent screen for the subject, wherein the video projection device includes:

a projector configured to:

generate first video light as the video light and irradiate the transparent screen with the generated first video light, wherein generation of the specific video is based on the first video light, and wherein the video projection device is further configured to:

move a position of the projector based on the positional information to cause the specific video to appear on the transparent screen for the specific subject, wherein the transparent screen includes a screen having a shape of a cylinder and a double lenticular function in which a focal distance on an outer surface side is shorter than a focal distance on an inner surface side, the screen includes two holograms each of which is of a transmission type, and a shape of each of the two holograms is cylindrical.

2. The display device according to claim 1, wherein the video projection device is further configured to:

generate the video light including the first video light and a second video light based on the positional information, and irradiate the transparent screen with the generated video light, wherein the first video light is for generation of the specific video, the second video light is for generation of video different from the specific video around the specific video.

3. The display device according to claim 2, wherein a gradation of the second video light is lower than a maximum gradation of the first video light.

4. The display device according to claim 2, wherein the second video light includes light corresponding to a black video.

5. The display device according to claim 1, wherein the video projection device is further configured to:

generate a video signal based on the positional information and image data corresponding to the specific video to cause the specific video to appear on the transparent screen for the specific subject, wherein the projector is further configured to:

generate the video light based on the generated video signal, and wherein the video projection device further includes a mirror configured to:

reflect the video light generated by the projector, to irradiate the transparent screen with the video light.

6. The display device according to claim 1, wherein each of the two holograms has a diffusing property and each of the two holograms is configured to diffuse the video light; and the video projection device is further configured to:

generate a video signal based on the positional information and image data corresponding to the specific video to cause the specific video to appear on the transparent screen for the specific subject, wherein the projector is further configured to:

generate the video light based on the generated video signal and emit the video light to cause the video light to pass through a central axis of each of the two holograms, and wherein the video projection device further includes a mirror configured to:

omnidirectionally reflect the video light at 360° around the central axis of each of the two holograms, to irradiate the transparent screen with the video light, wherein the video light is emitted from the projector.

7. The display device according to claim 1, wherein the shape of each of the two holograms is of a sheet and each of the two holograms has a diffusing property to diffuse the video light and a light condensing property to condense the video light.

8. The display device according to claim 7, wherein the video projection device is further configured to:

dispose the projector to cause an optical axis of the video light to obliquely intersect the transparent screen, and move the position of the projector to cause an angle between the optical axis of the video light and the transparent screen to be constant.

\* \* \* \* \*